(12) United States Patent
Ho et al.

(10) Patent No.: US 11,550,094 B1
(45) Date of Patent: Jan. 10, 2023

(54) BACKLIGHT MODULE AND METHOD OF MANUFACTURING THE SAME

(71) Applicant: Chicony Power Technology Co., Ltd., New Taipei (TW)

(72) Inventors: Hsuan-Wei Ho, New Taipei (TW); Tsung-Hsun Chen, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/809,007

(22) Filed: Jun. 26, 2022

(30) Foreign Application Priority Data

Mar. 8, 2022 (TW) .................................. 111108383

(51) Int. Cl.
*F21V 8/00* (2006.01)
*H01H 13/83* (2006.01)

(52) U.S. Cl.
CPC ......... *G02B 6/0031* (2013.01); *G02B 6/0065* (2013.01); *G02B 6/0083* (2013.01); *G02B 6/0088* (2013.01); *H01H 13/83* (2013.01)

(58) Field of Classification Search
CPC .. G02B 6/0031; G02B 6/0065; G02B 6/0083; G02B 6/0088; H01H 13/83
See application file for complete search history.

(56) References Cited

U.S. PATENT DOCUMENTS

| | | | |
|---|---|---|---|
| 2003/0169047 A1* | 9/2003 | Chen | G01R 31/3648 324/425 |
| 2015/0229032 A1 | 8/2015 | Liu et al. | |
| 2017/0336053 A1 | 11/2017 | Kim et al. | |
| 2020/0402748 A1* | 12/2020 | Cheng | G02B 6/0055 |

FOREIGN PATENT DOCUMENTS

| | | |
|---|---|---|
| CN | 110972495 A | 4/2020 |
| TW | 201026170 A | 7/2010 |
| TW | 201145530 A1 | 12/2011 |
| TW | 201217434 A1 | 5/2012 |
| TW | 201419315 A | 5/2014 |
| TW | 201517096 A | 5/2015 |
| TW | 201916084 A | 4/2019 |
| TW | 201919081 A | 5/2019 |
| TW | M603188 U | 10/2020 |
| TW | M606487 U | 1/2021 |

* cited by examiner

*Primary Examiner* — Mary Ellen Bowman
(74) *Attorney, Agent, or Firm* — CKC & Partners Co., LLC

(57) ABSTRACT

A backlight module includes a cover plate, a light guide plate, a circuit board, a reflective layer, and a light source. The light guide plate is disposed under the cover plate and has a first hole corresponding to a light-shielding region of the cover plate. The circuit board is disposed under the light guide plate and includes a first substrate and a conductive layer having a through hole. The reflective layer is disposed between the light guide plate and the circuit board and has a second hole. The first substrate is in contact with the reflective layer. The conductive layer is disposed between the first substrate and the reflective layer having a recess recessed into the through hole. The light source is disposed on the circuit board, accommodated in the first hole and the second hole corresponding thereto, and in contact with the conductive layer.

15 Claims, 7 Drawing Sheets

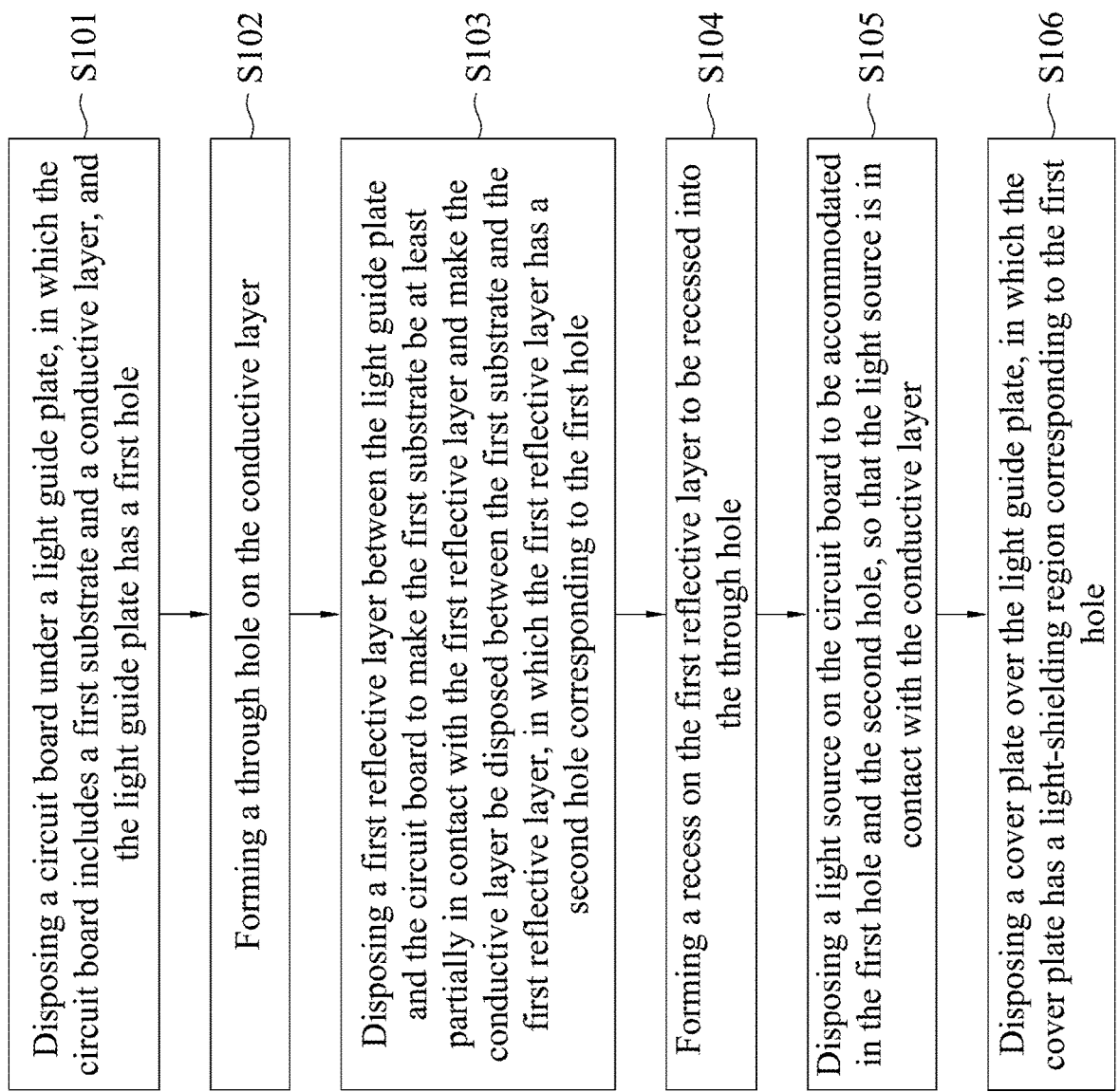

BACKLIGHT MODULE AND METHOD OF MANUFACTURING THE SAME

CROSS-REFERENCE TO RELATED APPLICATION

This application claims priority to Taiwan Application Serial Number 111108383, filed Mar. 8, 2022, which is herein incorporated by reference.

BACKGROUND

Technical Field

The present disclosure relates to a keyboard device, and more particularly, to a backlight module used in a keyboard device and a method of manufacturing the same.

Description of Related Art

The appearances of traditional keyboards are usually monotonous and dull, so computer peripheral manufacturers have developed light-emitting keyboards with excellent visual effects. The light-emitting keyboards have backlight modules.

Although the designs of the backlight modules of the traditional keyboards are simple, their thicknesses cannot meet the market demand for the thinning of the backlight module. With the evolution of the LED technology, the backlight module of an existing keyboard uses a light-emitting module with a light-emitting element of a smaller size and a light guide plate to achieve thinning in thickness. However, such light-emitting element usually emits light upwardly, and direction of the light needs to be turned by the reflective layer to laterally travel into the light guide plate, so the light loss during the turning process will reduce the light efficiency of the backlight module.

Accordingly, how to provide a backlight module to solve the aforementioned problems becomes an important issue to be solved by those in the industry.

SUMMARY

An aspect of the disclosure is to provide a backlight module that can efficiently solve the aforementioned problems.

According to an embodiment of the disclosure, a backlight module includes a cover plate, a light guide plate, a circuit board, a first reflective layer, and a light source. The cover plate has a light-shielding region. The light guide plate is disposed under the cover plate and has a first hole corresponding to the light-shielding region. The circuit board is disposed under the light guide plate and includes a first substrate and a conductive layer. The conductive layer has a through hole. The first reflective layer is disposed between the light guide plate and the circuit board and has a second hole corresponding to the first hole. The first substrate is at least partially in contact with the first reflective layer. The conductive layer is disposed between the first substrate and the first reflective layer. The first reflective layer has a recess recessed into the through hole. The light source is disposed on the circuit board and accommodated in the first hole and the second hole. The light source is in contact with the conductive layer.

In an embodiment of the disclosure, the backlight module further includes a second reflective layer. The second reflective layer is disposed on the circuit board and connected to the first reflective layer.

In an embodiment of the disclosure, the second reflective layer is located within an inner edge of the first hole.

In an embodiment of the disclosure, the first reflective layer and the second reflective layer overlap within the inner edge of the first hole.

In an embodiment of the disclosure, a coefficient of thermal expansion (CTE) of the first substrate is greater than a CTE of the first reflective layer.

In an embodiment of the disclosure, the circuit board further includes a second substrate. The second substrate is disposed on and in contact with a side of the first substrate away from the first reflective layer. A CTE of the first substrate is greater than a CTE of the second substrate.

In an embodiment of the disclosure, the cover plate further includes a light output region. The through hole is located under the light output region.

In an embodiment of the disclosure, the cover plate further has a light reflection region located between the light-shielding region and the light source.

According to an embodiment of the disclosure, a method of manufacturing a backlight module includes: disposing a circuit board under a light guide plate, in which the circuit board comprises a first substrate and a conductive layer, and the light guide plate has a first hole; forming a through hole on the conductive layer; disposing a first reflective layer disposed between the light guide plate and the circuit board to make the first substrate be at least partially in contact with the first reflective layer and make the conductive layer be disposed between the first substrate and the first reflective layer, in which the first reflective layer has a second hole corresponding to the first hole; forming a recess on the first reflective layer to be recessed into the through hole; disposing a light source on the circuit board to be accommodated in the first hole and the second hole, so that the light source is in contact with the conductive layer; and disposing a cover plate over the light guide plate, in which the cover plate has a light-shielding region corresponding to the first hole.

In an embodiment of the disclosure, the method further includes: disposing a second reflective layer on the circuit board to be connected to the first reflective layer.

In an embodiment of the disclosure, the disposing the second reflective layer on the circuit board locates the second reflective layer within an inner edge of the first hole.

In an embodiment of the disclosure, the disposing the second reflective layer on the circuit board makes the first reflective layer and the second reflective layer overlap within the inner edge of the first hole.

In an embodiment of the disclosure, the method further includes: disposing a second substrate on a side of the first substrate away from the first reflective layer, in which a CTE of the first substrate is greater than a CTE of the second substrate.

In an embodiment of the disclosure, the cover plate further includes a light output region. The step of disposing the cover plate over the light guide plate makes the light output region be above the through hole.

Accordingly, in the backlight module of the present disclosure, by making the reflective layer be partially recessed into the through hole of the conductive layer to form a recess, the reflective layer can use the space of the recess to uniformly reflect the light therein and then return the reflected light back to the light guide plate again, thereby achieving a gain in the amount of light. In addition, since the position of the recess of the reflective layer directly corresponds to the light output region of the cover plate above, the light output of the backlight module can be increased. Furthermore, in addition to the reflective layer provided under the light guide plate, another reflective layer is disposed below the light source located in the hole of the light guide plate, so that the lateral light of the light source can be reflected in the hole of the light guide plate and then enter the light guide plate, thereby increasing the amount of light entering the light guide plate. By overlapping the two reflective layers within the inner edge of the hole, the problem of increasing the overall thickness of the backlight module due to the overlapping two-layer reflective layers can be avoided. By adopting the stacked structure with one layer having a larger CTE value stacked between two layers each having a smaller CTE value for the circuit board, the problem of manufacturing or assembling precision of the backlight module caused by the expansion and contraction of the circuit board can be avoided. By forming a through hole on the conductive layer of the circuit board, the amount of expansion and contraction of the circuit board can be more easily controlled.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 7 is a flowchart of a method of manufacturing a backlight module according to an embodiment of the present disclosure.

DETAILED DESCRIPTION

Figure 1:
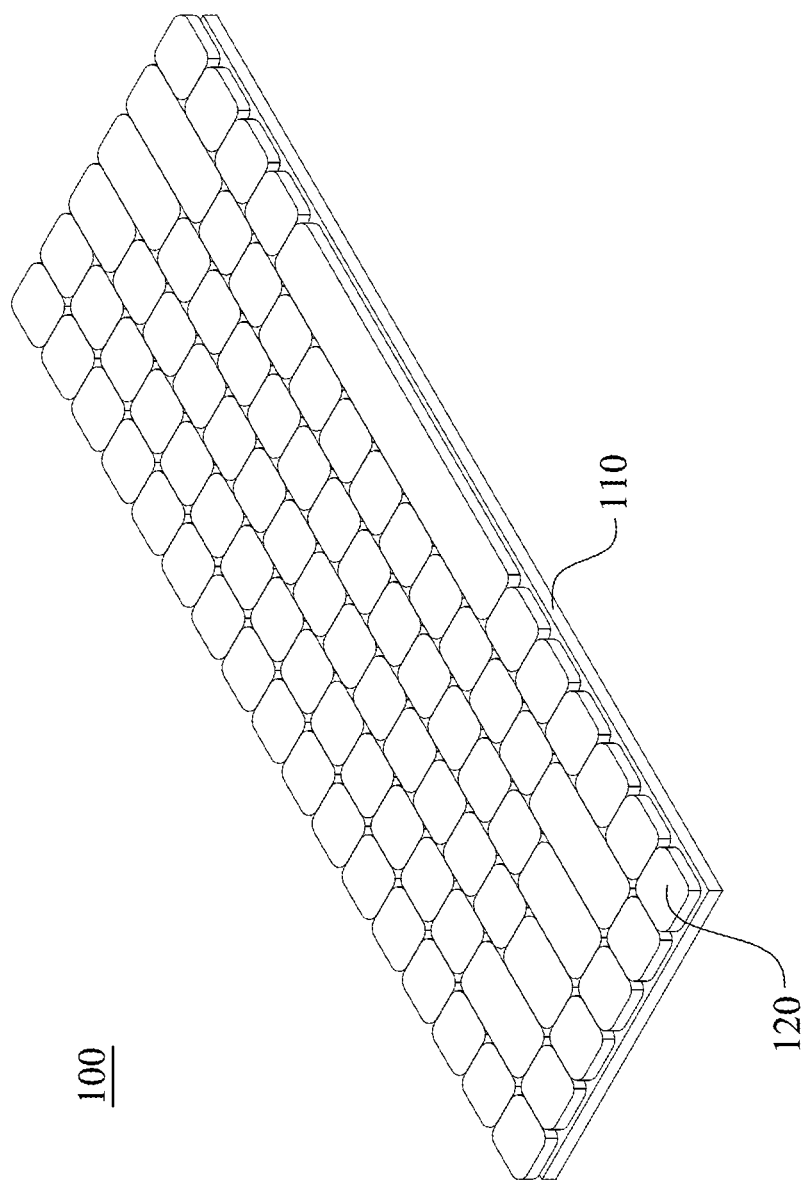
FIG. 1 is a top view of a keyboard device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a top view of a keyboard device 100 according to an embodiment of the disclosure. As shown in FIG. 1, in the present embodiment, the keyboard device 100 includes a bottom plate 110, a plurality of keyswitch assemblies 120, and a backlight module 200 (marked in FIG. 2). The keyswitch assemblies 120 are disposed over the bottom plate 110 and configured for the user to press. The backlight module 200 is disposed between the bottom plate 110 and the keyswitch assemblies 120, and is configured to emit light toward the keyswitch assemblies 120, so that the keyboard device 100 becomes a light-emitting keyboard. In addition, the keyboard device 100 of the disclosure may be an external keyboard (e.g., a keyboard with a PS/2 interface or a keyboard with a USB interface) used in a desktop computer, or may be a part of a computer system having an input device (e.g., a touch pad on a notebook computer) that is in the form of a keyswitch, but the present disclosure is not limited in this regard. That is, concepts of the keyboard device 100 of the disclosure may be used in any electronic product that performs input function by pressing.

Figure 2:
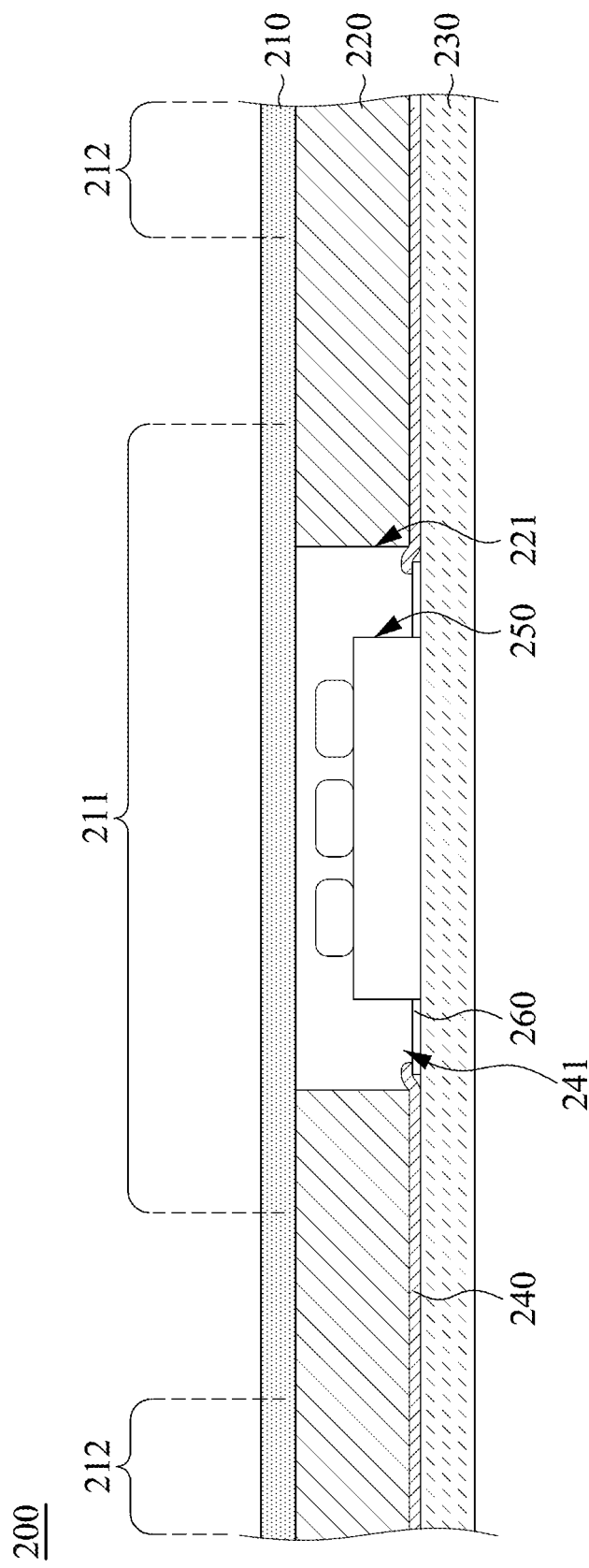
FIG. 2 is a cross-sectional view of a backlight module according to an embodiment of the present disclosure.

Reference is made to FIG. 2. FIG. 2 is a cross-sectional view of the backlight module 200 according to an embodiment of the present disclosure. As shown in FIG. 2, in the present disclosure, the backlight module 200 includes a cover plate 210, a light guide plate 220, a circuit board 230, and a light source 250. The cover plate 210 has a light-shielding region 211 and a light output region 212. The light guide plate 220 is disposed under the cover plate 210 and vertically corresponds to the light output region 212 of the cover plate 210. The light guide plate 220 has a first hole 221, and the first hole 221 vertically corresponds to the light-shielding region 211 of the cover plate 210. The circuit board 230 is disposed under the light guide plate 220. The light source 250 is disposed on the circuit board 230. The light source 250 includes a plurality of light-emitting elements (e.g., red light-emitting elements, green light-emitting elements, and blue light-emitting elements), but the present disclosure is not limited in this regard. In some other embodiments, the light source 250 may include only a single light-emitting element. In some embodiments, the light-emitting elements may be, but not limited to, light emitting diodes (LEDs).

As shown in FIG. 2, in the present embodiment, the backlight module 200 further includes a first reflective layer 240 and a second reflective layer 260. The first reflective layer 240 is disposed between the light guide plate 220 and the circuit board 230. The first reflective layer 240 vertically corresponds to the light output region 212 of the cover plate 210. The second reflective layer 260 is disposed on the circuit board 230 and connected to the first reflective layer 240. In this way, the lateral light of the light source 250 can be reflected upwardly by the first reflective layer 240 and the second reflective layer 260, thereby increasing the amount of light entering the light guide plate 220. In addition, the lateral light of the light source 250 will not leak to the circuit board 230 from the connecting position of the first reflective layer 240 and the second reflective layer 260.

As shown in FIG. 2, in the present embodiment, the first reflective layer 240 has a second hole 241. The second hole 241 of the first reflective layer 240 corresponds to and is adjacent to the first hole 221 of the light guide plate 220. The second reflective layer 260 is located within an inner edge of the first hole 221. In this way, the lateral light of the light source 250 can enter the light guide plate 220 after being reflected by the second reflective layer 260 in the first hole 221 of the light guide plate 220, thereby increasing the amount of light entering the light guide plate 220.

Furthermore, as shown in FIG. 2, the first reflective layer 240 and the second reflective layer 260 overlap within the inner edge of the first hole 221. In this way, in addition to enabling the lateral light of the light source 250 in the first hole 221 to be more effectively reflected by the second reflective layer 260 enter the light guide plate 220 again, the problem of increasing the overall thickness of the backlight module 200 by the overlapping first reflective layer 240 and the second reflective layer 260 can also be avoided. In the present embodiment, the outer edge portion of the second reflective layer 260 is overlapped between the circuit board 230 and the first reflective layer 240, but the present disclosure is not limited in this regard. In some other embodiments, the inner edge portion of the first reflective layer 240 adjacent to the second hole 241 is overlapped between the circuit board 230 and the second reflective layer 260.

Figure 3:
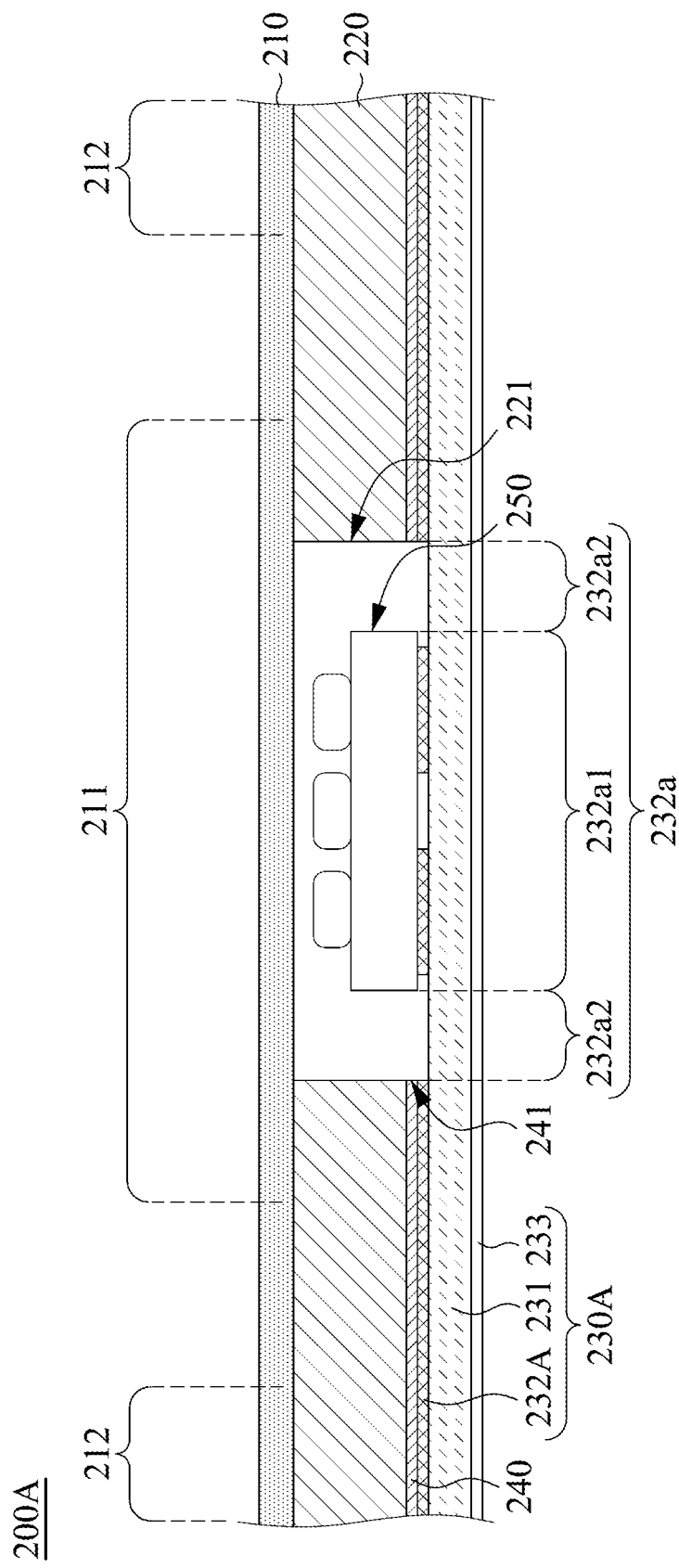
FIG. 3 is a cross-sectional view of a backlight module according to another embodiment of the present disclosure.

Reference is made to FIG. 3. FIG. 3 is a cross-sectional view of a backlight module 200A according to another embodiment of the present disclosure. As shown in FIG. 3, in the present embodiment, the backlight module 200A includes a cover plate 210, a light guide plate 220, a circuit board 230A, a first reflective layer 240, and a light source 250, in which the cover plate 210, the light guide plate 220, the first reflective layer 240, and the light source 250 are identical to those in the embodiment of FIG. 2. Therefore, for the introduction of these components, reference may be made to the above related descriptions, which will not be repeated here. In other words, the backlight module 200A of the present embodiment provides the modified circuit board 230A.

Specifically, in the present embodiment, the circuit board 230A includes a first substrate 231 and a conductive layer 232A. The first substrate 231 is at least partially in contact with the first reflective layer 240. The conductive layer 232A is disposed between the first substrate 231 and the first reflective layer 240. A coefficient of thermal expansion (CTE) of the first substrate 231 is greater than a CTE of the first reflective layer 240. In this way, the amount of expansion and contraction of the first substrate 231 can be suppressed by the first reflective layer 240. In addition, in the present embodiment, the circuit board 230A further includes a second substrate 233. The second substrate 233 is disposed on and in contact with a side of the first substrate 231 away from the first reflective layer 240. The CTE of the first substrate 231 is greater than a CTE of the second substrate 233. The first reflective layer 240, the first substrate 231, and the second substrate 233 form a stacked structure with one layer having a larger CTE value stacked between two layers each having a smaller CTE value, the problem of manufacturing or assembling precision of the backlight module 200A caused by the expansion and contraction of the circuit board 230A can be avoided. It should be noted that the phrase "in contact with" used herein may refer to "directly contacting" or "contacting via adhesive".

In some embodiments, the material of the first substrate 231 includes polyethylene terephthalate (PET), but the present disclosure is not limited in this regard. In some embodiments, the material of at least one of the first reflective layer 240 and the second substrate 233 includes polyimide (PI), but the present disclosure is not limited in this regard.

In some embodiments, the material of the conductive layer 232A includes copper, but the present disclosure is not limited in this regard.

As shown in FIG. 3, in the present embodiment, the conductive layer 232A has a mounting region 232a. The mounting region 232a is embedded in the first substrate 231. The mounting region 232a is disposed corresponding to the second hole 241 of the first reflective layer 240 and includes a first region 232a1 and a second region 232a2. The light source 250 is electrically connected to the first region 232a1. In some embodiments, the backlight module 200A shown in FIG. 3 may include the second reflective layer 260 of the backlight module 200 shown in FIG. 2, and the second reflective layer 260 is disposed in the second region 232a2.

Figure 4:
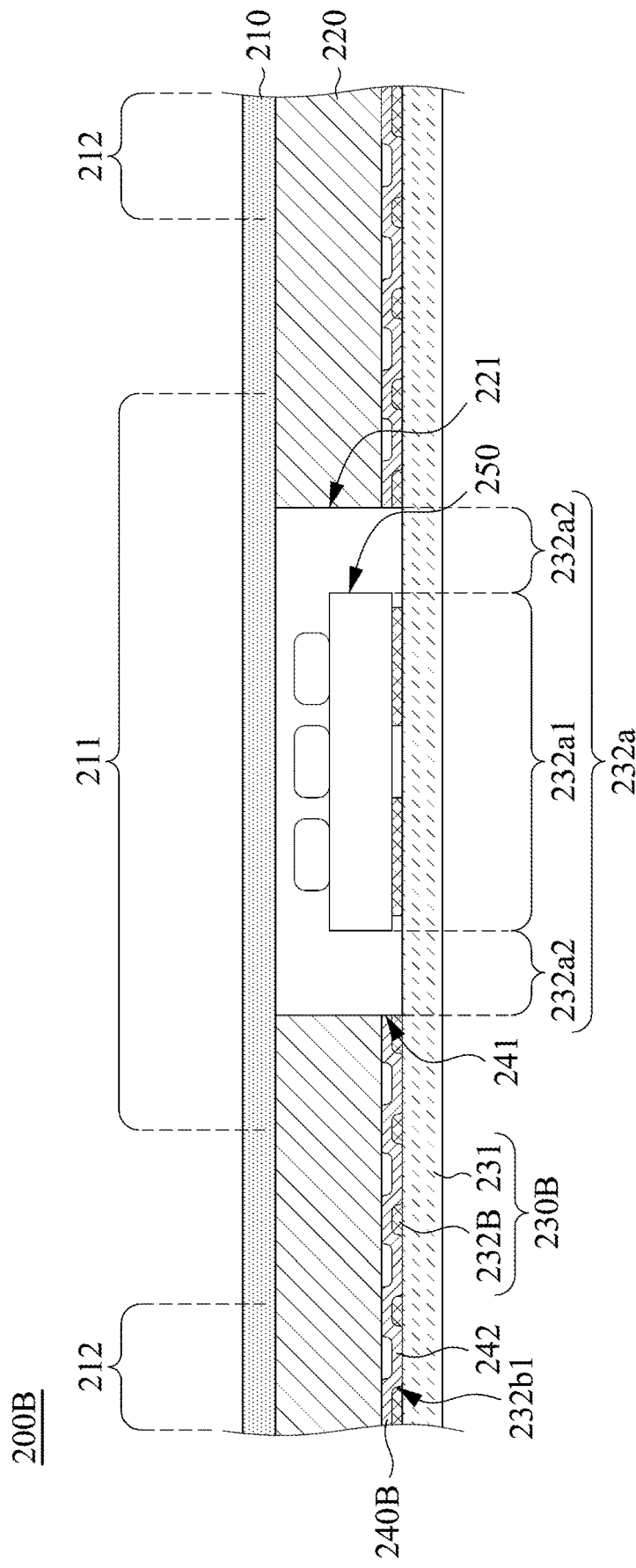
FIG. 4 is a cross-sectional view of a backlight module according to another embodiment of the present disclosure.
Figure 5:
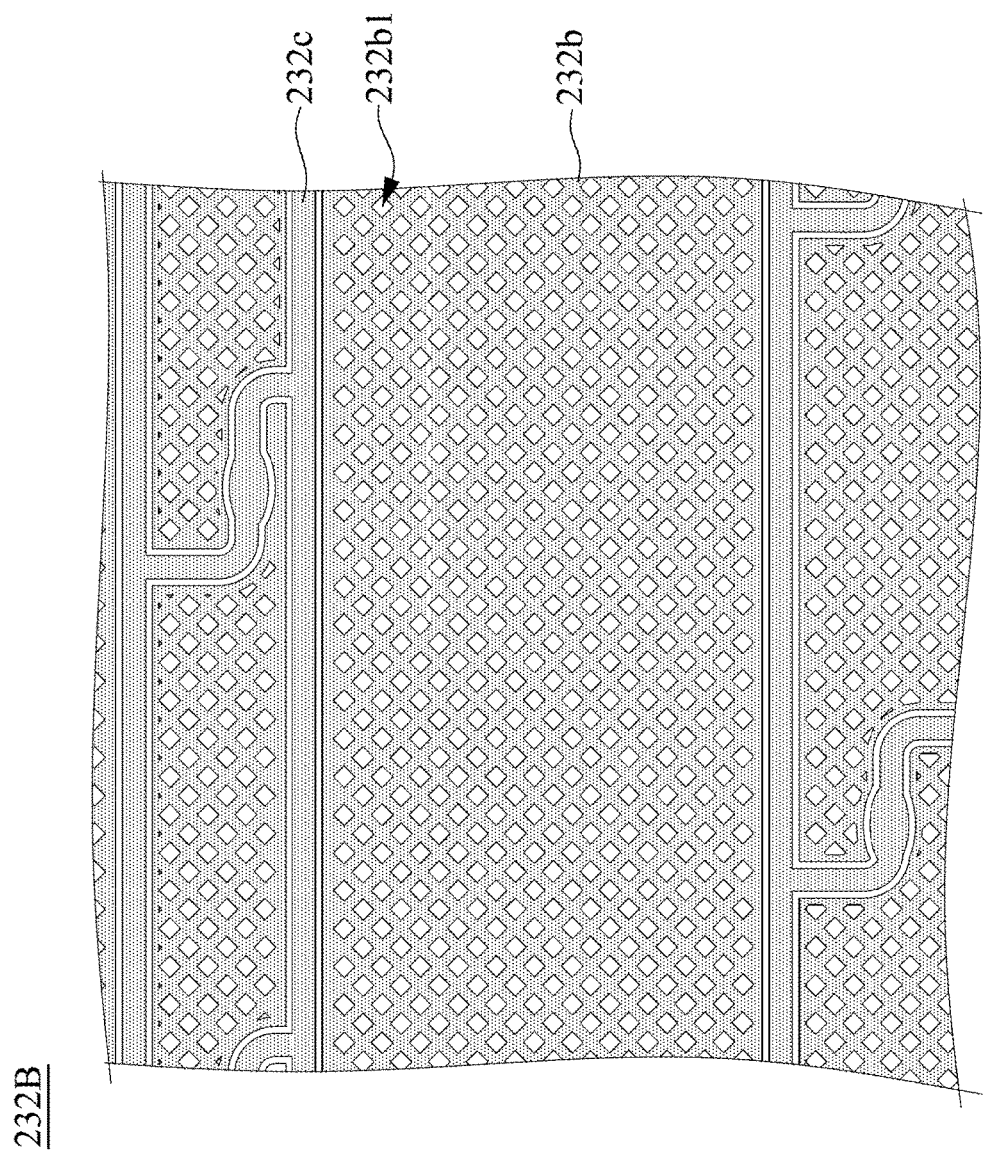
FIG. 5 is a top view of a conductive layer according to an embodiment of the present disclosure.

Reference is made to FIGS. 4 and 5. FIG. 4 is a cross-sectional view of a backlight module 200B according to another embodiment of the present disclosure. FIG. 5 is a top view of a conductive layer 232B according to an embodiment of the present disclosure. As shown in FIGS. 4 and 5, in the present embodiment, the backlight module 200B includes a cover plate 210, a light guide plate 220, a circuit board 230B, a first reflective layer 240B, and a light source 250, in which the cover plate 210, the light guide plate 220, and the light source 250 are identical to those in the embodiment of FIG. 3. Therefore, for the introduction of these components, reference may be made to the above related descriptions, which will not be repeated here. In other words, the backlight module 200B of the present embodiment provides the modified first reflective layer 240B and circuit board 230B.

Specifically, compared with the embodiment shown in FIG. 3, the conductive layer 232B in the embodiment shown in FIG. 4 has a plurality of through holes 232b1 located under the light output region 212 of the cover plate 210. In addition, as shown in FIG. 5, the conductive layer 232B includes a non-polar region 232b and a polar region 232c. The non-polar region 232b is electrically insulated from the polar region 232c. The polar region 232c forms a plurality of traces configured to flow current, and the through holes 232b1 are formed in the non-polar region 232b. With the structural configurations, the through holes 232b1 of the conductive layer 232B can make the expansion and contraction of the circuit board 230B easier to control.

Furthermore, as shown in FIGS. 4 and 5, the first reflective layer 240B has a plurality of recesses 242 respectively recessed into the through holes 232b1 of the conductive layer 232B. Therefore, the surface of the first reflective layer 240B is not smooth. The recesses 242 are formed by partially recessing the first reflective layer 240B into the through holes 232b1 of the conductive layer 232B, so that the first reflective layer 240B can use the spaces of the recesses 242 to uniformly reflect the light therein and then return the reflected light back to the light guide plate 220 again, thereby achieving a gain in the amount of light. In addition, since the positions of the recesses 242 of the first reflective layer 240B directly correspond to the light output region 212 of the cover plate 210 above, the light output of the backlight module 200B can be increased.

Figure 6:
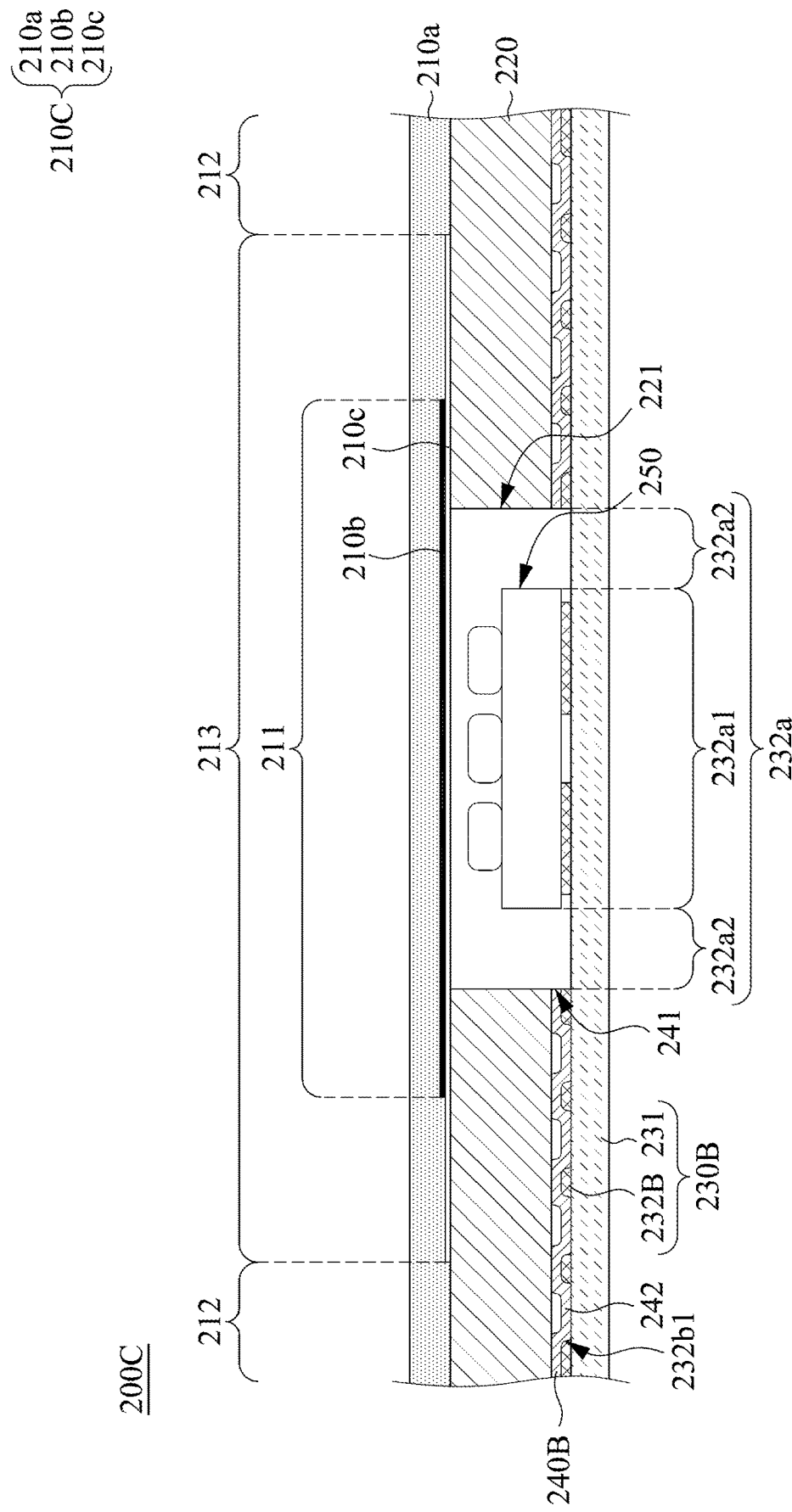
FIG. 6 is a cross-sectional view of a backlight module according to another embodiment of the present disclosure.

Reference is made to FIG. 6. FIG. 6 is a cross-sectional view of a backlight module 200C according to another embodiment of the present disclosure. As shown in FIG. 6, in the present embodiment, the backlight module 200C includes a cover plate 210C, a light guide plate 220, a circuit board 230B, a first reflective layer 240B, and a light source 250, in which the light guide plate 220, the circuit board 230B, the first reflective layer 240B, and the light source 250 are identical to those in the embodiment of FIG. 4. Therefore, for the introduction of these components, reference may be made to the above related descriptions, which will not be repeated here. In other words, the backlight module 200C of the present embodiment provides the modified cover plate 210C.

Specifically, in the present embodiment, in addition to the light-shielding region 211 and the light output region 212, the cover plate 210C further has a light-reflecting region 213 between the light-shielding are region a 211 and the light source 250. In detail, the cover plate 210C includes a plate body 210a, a light-shielding layer 210b, and a light-reflecting layer 210c. The plate body 210a covers the top of the light guide plate 220. The light-shielding layer 210b is disposed on a side of the plate body 210a facing the light guide plate 220. The light-shielding region 211 is defined by the light-shielding layer 210b. The light-shielding layer 210b completely covers the first hole 221 of the light guide plate 220. The light-reflecting layer 210c is disposed on the side of the plate body 210a facing the light guide plate 220 and covers the light-shielding layer 210b. The light-reflecting region 213 is defined by the light-reflecting layer 210c. With the aforementioned structural configurations, the strong front light (i.e., the light emitted upward) of the light source 250 can be reflected and become the lateral light, and the light can be mixed again to improve the uniformity of the white light.

In some embodiments, the area of the light-shielding layer 210b extending outwardly from the edge of the first hole 221 is more than 40% of the size of the first hole 221, but the disclosure is not limited in this regard. In this way, the light emitted by the light source 250 can be effectively prevented from leaving the upper opening of the first hole 221, thereby ensuring that the light can enter the light guide plate 220 through the inner wall of the first hole 221.

In some embodiments, the area of the light-reflecting layer 210c is more than twice the size of the first hole 221, but the present disclosure is not limited in this regard.

It should be noted that the different features of the embodiments shown in FIG. 2, FIG. 3, FIG. 4, and FIG. 6 can be flexibly combined in an embodiment as long as they are not mutually exclusive.

Reference is made to FIG. 7. FIG. 7 is a flowchart of a method of manufacturing a backlight module according to an embodiment of the present disclosure. As shown in FIG. 7, the method of manufacturing a backlight module mainly includes steps S101 to S106. The following description can be used with reference to the backlight module 200B shown in FIG. 4.

Step S101: disposing a circuit board 230B under a light guide plate 220, in which the circuit board 230B includes a first substrate 231 and a conductive layer 232B, and the light guide plate 220 has a first hole 221.

Step S102: forming a through hole 232b1 on the conductive layer 232B.

Step S103: disposing a first reflective layer 240B between the light guide plate 220 and the circuit board 230B to make the first substrate 231 be at least partially in contact with the first reflective layer 240B and make the conductive layer 232B be disposed between the first substrate 231 and the first reflective layer 240B, in which the first reflective layer 240B has a second hole 241 corresponding to the first hole 221.

Step S104: forming a recess 242 on the first reflective layer 240B to be recessed into the through hole 232b1.

Step S105: disposing a light source 250 on the circuit board 230B to be accommodated in the first hole 221 and the second hole 241, so that the light source 250 is in contact with the conductive layer 232B.

Step S106: disposing a cover plate 210 over the light guide plate 220, in which the cover plate 210 has a light-shielding region 211 corresponding to the first hole 221.

In practical applications, the sequence of steps S101 to S106 can be flexibly adjusted according to actual needs.

In some embodiments, step S102 is performed earlier than step S101. In some embodiments, step S104 may be performed concurrently during the execution of step S103.

In some embodiments, as shown in FIG. 2, the method of manufacturing a backlight module further includes step S107.

Step S107: disposing a second reflective layer 260 on the circuit board 230 to be located within an inner edge of the first hole 221.

In some embodiments, as shown in FIG. 4, the conductive layer 232B has a mounting region 232a. The mounting region 232a is disposed corresponding to the second hole 241 of the first reflective layer 240B and includes a first region 232a1 and a second region 232a2. Step S105 makes the light source 250 be electrically connected to the first region 232a1.

In some embodiments, step S107 is performed earlier than step S105. With reference to FIG. 4, in step S107, the second reflective layer 260 is disposed in the second region 232a2.

In some embodiments, as shown FIG. 4, the cover plate 210 further includes a light output region 212. Step S106 makes the light output region 212 be located over the through hole 232b1.

According to the foregoing recitations of the embodiments of the disclosure, it can be seen that in the backlight module of the present disclosure, by making the reflective layer be partially recessed into the through hole of the conductive layer to form a recess, the reflective layer can use the space of the recess to uniformly reflect the light therein and then return the reflected light back to the light guide plate again, thereby achieving a gain in the amount of light. In addition, since the position of the recess of the reflective layer directly corresponds to the light output region of the cover plate above, the light output of the backlight module can be increased. Furthermore, in addition to the reflective layer provided under the light guide plate, another reflective layer is disposed below the light source located in the hole of the light guide plate, so that the lateral light of the light source can be reflected in the hole of the light guide plate and then enter the light guide plate, thereby increasing the amount of light entering the light guide plate. By overlapping the two reflective layers within the inner edge of the hole, the problem of increasing the overall thickness of the backlight module due to the overlapping two-layer reflective layers can be avoided. By adopting the stacked structure with one layer having a larger CTE value stacked between two layers each having a smaller CTE value for the circuit board, the problem of manufacturing or assembling precision of the backlight module caused by the expansion and contraction of the circuit board can be avoided. By forming a through hole on the conductive layer of the circuit board, the amount of expansion and contraction of the circuit board can be more easily controlled.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A backlight module, comprising:
a cover plate having a light-shielding region;
a light guide plate disposed under the cover plate and having a first hole corresponding to the light-shielding region;

a circuit board disposed under the light guide plate and comprising a first substrate and a conductive layer, the conductive layer having a through hole;

a first reflective layer disposed between the light guide plate and the circuit board and having a second hole corresponding to the first hole, wherein the first substrate is at least partially in contact with the first reflective layer, the conductive layer is disposed between the first substrate and the first reflective layer, and the first reflective layer has a recess recessed into the through hole; and a light source disposed on the circuit board and accommodated in the first hole and the second hole, wherein the light source is in contact with the conductive layer.

2. The backlight module of claim 1, further comprising a second reflective layer disposed on the circuit board and connected to the first reflective layer.

3. The backlight module of claim 2, wherein the second reflective layer is located within an inner edge of the first hole.

4. The backlight module of claim 3, wherein the first reflective layer and the second reflective layer overlap within the inner edge of the first hole.

5. The backlight module of claim 1, wherein a coefficient of thermal expansion of the first substrate is greater than a coefficient of thermal expansion of the first reflective layer.

6. The backlight module of claim 1, wherein the circuit board further comprises:

a second substrate disposed on and in contact with a side of the first substrate away from the first reflective layer, wherein a coefficient of thermal expansion of the first substrate is greater than a coefficient of thermal expansion of the second substrate.

7. The backlight module of claim 1, wherein the cover plate further comprises a light output region, and the through hole is located under the light output region.

8. The backlight module of claim 1, wherein the cover plate further has a light reflection region located between the light-shielding region and the light source.

9. A method of manufacturing a backlight module, comprising:

disposing a circuit board under a light guide plate, wherein the circuit board comprises a first substrate and a conductive layer, and the light guide plate has a first hole;

forming a through hole on the conductive layer;

disposing a first reflective layer disposed between the light guide plate and the circuit board to make the first substrate be at least partially in contact with the first reflective layer and make the conductive layer be disposed between the first substrate and the first reflective layer, wherein the first reflective layer has a second hole corresponding to the first hole;

forming a recess on the first reflective layer to be recessed into the through hole;

disposing a light source on the circuit board to be accommodated in the first hole and the second hole, so that the light source is in contact with the conductive layer; and disposing a cover plate over the light guide plate, wherein the cover plate has a light-shielding region corresponding to the first hole.

10. The method of claim 9, further comprising:

disposing a second reflective layer on the circuit board to be connected to the first reflective layer.

11. The method of claim 10, wherein the disposing the second reflective layer on the circuit board locates the second reflective layer within an inner edge of the first hole.

12. The method of claim 11, wherein the disposing the second reflective layer on the circuit board makes the first reflective layer and the second reflective layer overlap within the inner edge of the first hole.

13. The method of claim 9, wherein a coefficient of thermal expansion of the first substrate is greater than a coefficient of thermal expansion of the first reflective layer.

14. The method of claim 9, further comprising:

disposing a second substrate on a side of the first substrate away from the first reflective layer, wherein a coefficient of thermal expansion of the first substrate is greater than a coefficient of thermal expansion of the second substrate.

15. The method of claim 9, wherein the cover plate further comprises a light output region, and the disposing the cover plate over the light guide plate makes the light output region be above the through hole.

* * * * *